Oct. 21, 1969   W. BACHMANN   3,473,726
COMPRESSOR FOR A MECHANICAL REFRIGERATOR
Filed April 16, 1968   2 Sheets-Sheet 1

INVENTOR
WOLFGANG BACHMANN
BY Emery L. Groff
ATTORNEY

Oct. 21, 1969  W. BACHMANN  3,473,726
COMPRESSOR FOR A MECHANICAL REFRIGERATOR
Filed April 16, 1968  2 Sheets-Sheet 2

INVENTOR
WOLFGANG BACHMANN
BY Emory L. Groff Jr.
ATTORNEY

United States Patent Office 3,473,726
Patented Oct. 21, 1969

3,473,726
COMPRESSOR FOR A MECHANICAL
REFRIGERATOR
Wolfgang Bachmann, Chatelaine-Geneva, Switzerland,
  assignor to Henry & Cie, Jean Kauer & Cie, Succ.,
  Chatelaine-Geneva, Switzerland, a corporation of
  Switzerland
Filed Apr. 16, 1968, Ser. No. 721,838
Claims priority, application Switzerland, Apr. 19, 1967,
5,573/67
Int. Cl. F04b 41/06, 45/04; F04d 25/16
U.S. Cl. 230—45                                    4 Claims

ABSTRACT OF THE DISCLOSURE

The non-rigid walls of two communicating chambers in the compressor are acted upon by the piston rod, so as to balance the forces acting on the latter. One of the chambers can act as a pre-compression chamber for the refrigerant gas. A motor-driven crank reciprocates the piston.

BACKGROUND OF THE INVENTION

The invention relates to a compressor for a mechanical refrigerator, including a motor that reciprocates a piston in a cylinder, a sealing diaphragm located between the cylinder block and the piston rod so as to constitute the non-rigid wall of a first, gas-tight chamber which collects any refrigerant gas that may escape between the piston and the cylinder wall.

Compressors of this short necessarily function under greatly varying pressure conditions while the mechanical refrigerator operates. Since the pressure in the gas-tight chamber varies greatly in the compressors commonly used today, there is located outside of the former a balancing spring that acts on the piston rod for the purpose of balancing out the force of the pressure inside the chamber. Since the spring rate of the spring is constant, whereas the pressure within the gas-tight chamber varies, it is obvious that a perfect balancing cannot be achieved.

SUMMARY OF THE INVENTION

The compressor of the invention avoids this defect. An object of the present invention is a compressor having a second chamber the pressure of which is always substantially equal to that in the gas-tight chamber and which acts on the piston rod so as to balance out any rise in pressure in the gas-tight chamber acting on the piston rod.

A further object of the invention is a compressor of the preceding object, wherein the second chamber is a pre-compression chamber for the compressor gas.

These objects and other objects of the invention will be apparent from the following detailed description.

BRIEF DESCRIPTION OF THE DRAWING

The invention will be decscribed with reference to the figures of the accompanying drawing, wherein.

DESCRIPTION OF THE PREFERRED EMBODIMENTS

Figure 1:
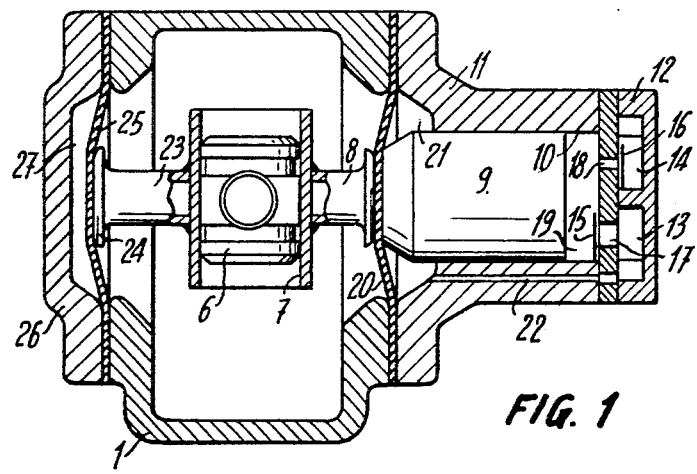
FIG. 1 is a partly sectional view, taken perpendicular to the piston-rod drive crank, of a first form of the invention.
Figure 2:
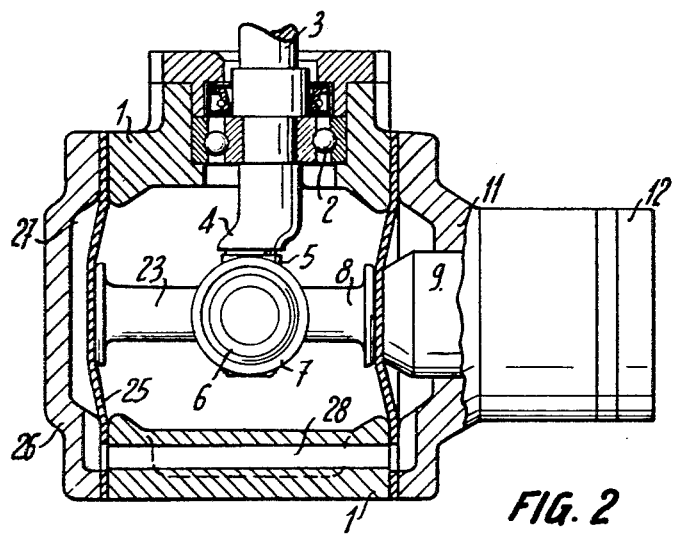
FIG. 2 is a view of the compressor, partly in section, taken along a plane parallel to the motor drive shaft.

With reference to FIGS. 1 and 2, the compressor incorporates a housing 1 within which is mounted a ball-bearing 2 in which a drive shaft 3 rotates. The drive shaft, which is customarily turned by an electric motor (not shown), terminates in a crank 4, of which the pin 5 is held in a cylindrically-shaped slide 6 which reciprocates in a cylindrical sleeve 7 rigidly connected to the rod 8 of the piston 9 for the compressor. The piston connected to the rod 8, slides in a cylinder 10 incorporated in a cylinder block 11. Mounted on the cylinder block is a cylinder head 12, which incorporates inlet and delivery conduits 13 and 14 respectively for the refrigerant gas of the compressor. Flap-valves 15 and 16 respectively control the inlet and outlet openings 17 and 18 of the compression chamber 19.

A sealing diaphragm 20 is located between the cylinder block 11 and the piston 8, which passes through the diaphragm and forms a seal therewith, so as to form a first, gas-tight chamber 21 having a non-rigid wall, the diaphragm 20, and which collects any refrigerant gas that may escape between the piston 9 and the wall of the cylinder 10. A conduit 22, incorporated in the cylinder block 11, conveys the escaped gas from the chamber 21 to the inlet conduit 13 of the compressor.

The piston rod 8 embodies an extension 23 located on the opposite side of the crank 4. The end 24 of the extension is enlarged and rounded and bears against a second diaphragm 25 held squeezed along its edge between the chamber 1 and a cover 26 mounted on the chamber 1 by means of screws (not shown). The diaphragm 25 constitutes the non-rigid wall of a second chamber 27 located opposite the first chamber 21. The chambers 21 and 27 are connected via a conduit 28, as shown in FIG. 2, incorporated in the housing 1. The arrangement is such that any rise in pressure in the sealed chamber 21 causes in the chamber 27 a similar rise that acts to balance the effect on the piston rod 8 of the pressure in the chamber 21. The compressor, consequently, operates in a state of perfect balance, however much the pressure in chamber 21 may vary, since a variation there causes a like change in the chamber 27, where the diaphragm 25 acts on the piston-rod extension 23 to oppose the force acting on the diaphragm 20.

Figure 3:
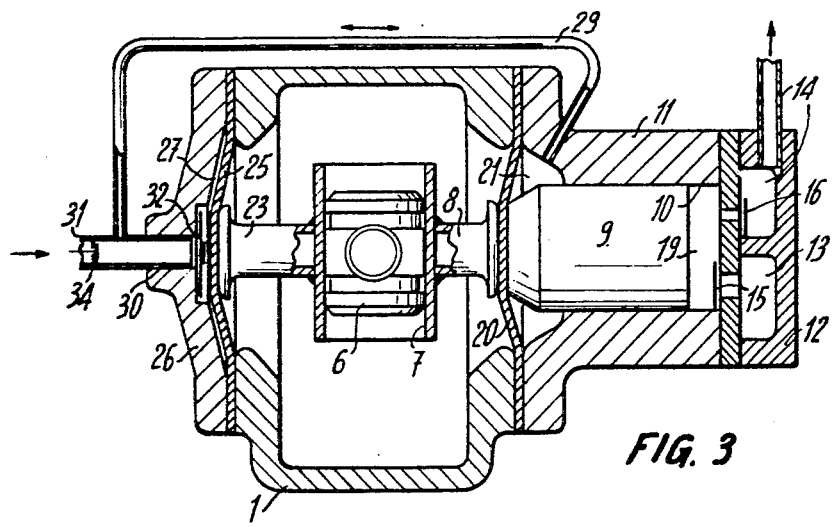
FIG. 3 is a view corresponding to FIG. 1 of a second form of the invention.
Figure 4:
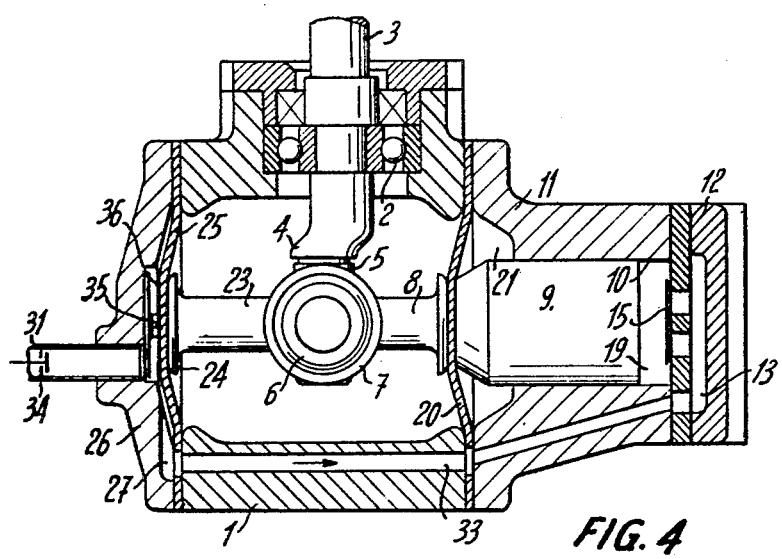
FIG. 4 is a view corresponding to FIG. 2 of the second form of the invention.

FIGS. 3 and 4 illustrate a second embodiment of the invention, wherein many of the parts are the same as in the embodiment of FIGS. 1 and 2: a housing 1, a crank 4 rotated by a drive shaft 3, a piston rod 8, a piston 9 reciprocating in a cylinder 10 of a cylinder block 11, a cylinder head 12, a first diaphragm 20 terminating a first chamber 21, and a second diaphragm 25 and a cover 26 defining a second chamber 27.

The extension 23 of the piston rod 8 has an enlarged rounded end 24 that bears against the diaphragm 25. In this form of the invention, the chambers 21 and 27 are connected together by a tube 29, rather than by the conduit 28 of the previous embodiment, and the chamber 27 is employed as the first (or pre-) compression-stage chamber of the compressor. The cover 26 incorporates an opening 30 that receives one end of a refrigerant gas supply pipe 31. The opening 30 is controlled by a flap-valve 32. A conduit 33, incorporated in the housing 1 and the cylinder block 11, connects the chamber 27 to the inlet 13 of the cylinder head 12. A non-return valve 34 is located in the pipe 31, the tube 29 being connected to the latter between the valves 32 and 34. The central part of the diaphragm 25 is securely attached to the piston rod extension end 24 by a screw 35 and a washer 36.

The second embodiment of the invention operates in the following manner:

During the compression stroke of the piston 9, the diaphragm 25 is caused to move towards the right (as seen in FIGS. 3 and 4), so that gas is sucked into the chamber 27 from the pipe 31, as well as from the chamber 21 via the tube 29. When the piston 9 moves leftwards, the gas in the chamber 27 is compressed, since the valve 32 is now closed, and this precompressed gas is expelled via the conduit 33 into the inlet 13, where it is admitted into the compressor compression-chamber 19 by the inlet valve 15. During the subsequent compression stroke of the piston 9, the gas held in the chamber 19 is compressed and expelled through the opening for valve 16 into the compressor delivery conduit 14.

This form of the invention possesses the same advantages as the first form, since any increase in pressure in the chamber 21 is reflected in the opposite chamber 27. The chamber 27, however, is not only a balancing chamber, but also serves as a pre-compression chamber for the compressor.

The invention admits of various modifications, and in particular the means by which the piston rod extension 23 moves the diaphragm 25 can be varied and still lie within the scope of the invention.

Although the preferred embodiments of the invention have been described, the scope of, and the breadth of protection afforded to, the invention are limited solely by the appended claims.

I claim:

1. A compressor for a mechanical refrigerator, wherein a motor reciprocates a piston in a cylinder, a sealing diaphragm located between the cylinder block and the piston rod and constituting the non-rigid wall of a first, gas-tight chamber which collects any gas refrigerant that may escape between the piston and the wall of the cylinder and the pressure in which chamber acts on the piston rod, and wherein the improvement comprises an extension for the piston rod, a second diaphragm borne upon by said extension and constituting the non-rigid wall of a second chamber located opposite the first, gas-tight chamber, means for providing fluid communication between the first and second chambers, the two diaphragms being so located with respect to each other that a rise in the pressure in the first, gas-tight chamber causes a corresponding pressure-rise in said second chamber that acts to cause a balancing force on the piston rod which opposes that caused by the pressure in the first, gas-tight chamber.

2. The compressor as defined in claim 1, wherein the first chamber is formed between the piston, the cylinder block, and the first diaphragm, the piston rod passes through the first diaphragm in sealing engagement therewith, so that the first diaphragm moves with the piston rod and exerts thereupon the force of the pressure in the first, gas-tight chamber, said piston rod extension is in-line with the piston rod, and means for holding the edges of the two diaphragms stationary.

3. The compressor as defined in claim 1, wherein said second chamber is used to precompress the refrigerant gas for the compressor, a refrigerant gas supply conduit means connected to said second chamber, a valve controlling said gas supply conduit means, a compression chamber, an inlet for said compression chamber, first conduit means for connecting said second chamber to said inlet, second conduit means for connecting together the first and second chambers, and a non-return valve located in said second conduit means for preventing a rise in pressure in said second chamber from being communicated to the first, gas-tight chamber.

4. The compressor as defined in claim 3, wherein said second conduit means is connected to said gas-supply conduit means, whereby any escaped refrigerant gas that collects in the first, gas-tight chamber is reintroduced into the compressor circuit.

References Cited
UNITED STATES PATENTS

| | | | |
|---|---|---|---|
| 1,593,838 | 7/1926 | Michelsen | 230—202 XR |
| 1,686,339 | 10/1928 | Murray | 74—18.1 XR |

ROBERT M. WALKER, Primary Examiner

U.S. Cl. X.R.

74—18.2; 230—172, 202